United States Patent
Rogers

[15] 3,690,615
[45] Sept. 12, 1972

[54] AUTOMATIC VALVE
[72] Inventor: Gerald L. Rogers, Ballwin, Mo.
[73] Assignee: Stile-Croft Manufacturers, Inc., St. Louis, Mo.
[22] Filed: July 24, 1970
[21] Appl. No.: 57,913

Related U.S. Application Data

[63] Continuation-in-part of Ser. No. 783,315, Dec. 12, 1968.

[52] U.S. Cl. .................................. 251/31, 251/58
[51] Int. Cl. ............................................ F16k 31/163
[58] Field of Search .......... 251/58, 340, 63.4, 139, 31

[56] References Cited

UNITED STATES PATENTS

| | | |
|---|---|---|
| 3,539,147 | 11/1970 | Paul, Jr. .......................... 251/58 |
| 3,509,913 | 5/1970 | Lewis ........................ 251/58 X |
| 3,291,440 | 12/1966 | Archer et al. ........... 251/340 X |

Primary Examiner—Arnold Rosenthal
Attorney—Cohn and Powell

[57] ABSTRACT

This valve includes a tubular body having inlet and outlet ports at opposite ends and housing a rotatable valve cut-off member. A cylinder is coaxially mounted to the body and a piston sleeve received by the cylinder is interconnected to the rotatable member to rotate this member between open and closed valve positions. The sleeve includes a collar and the cylinder includes annular closure walls at each end. The collar and closure walls define pressure chambers supplied by fluid to induce reciprocating motion into the sleeve.

8 Claims, 3 Drawing Figures

PATENTED SEP 12 1972 3,690,615

INVENTOR
GERALD L. ROGERS

Cohn and Powell
BY
ATTORNEYS

AUTOMATIC VALVE

CROSS REFERENCE TO RELATED APPLICATION

This is a continuation-in-part of copending application, Ser. No. 783,315 filed Dec. 12, 1968.

BACKGROUND OF THE INVENTION

This invention relates generally to an automatic valve in a fluid supply line and in particular to a cut-off valve operated by fluid pressure.

There are many instances in which cut-off valves, such as ball valves, must be operated automatically for efficient use. For example, such valves may not be readily accessible for manual operation. Further, it is often desirable to operate cut-off valves by remote control. In addition, the force required to operate the valve is frequently too great to be easily accomplished manually.

In the past, the problem of automating cut-off valves of the type under consideration has invariable been solved by simply providing a means of automatically turning the valve control handle by the use of auxiliary equipment. This has often been accomplished by simply providing an independent piston and cylinder arrangement and connecting it by means of a linkage assembly to the valve handle. Obviously, such an arrangement is bound to be cumbersome in addition to being expensive and it is not a satisfactory solution. An assembly of this kind must be mounted to the valve in close proximity to the operating handle and the piston and linkage assembly must in many cases be offset so that they may be adapted to suit a unit originally intended for manual operation.

SUMMARY OF THE INVENTION

This automatic valve is directly operated by fluid pressure. It does not rely on an auxiliary leverage system operated by an independent piston and cylinder.

The unit is compact, symmetrical and lightweight and may thus be used in confined locations. It greatly facilitates valve operation by remote control, and the reduction of the moving parts to an absolute minimum provides a valve which is not only trouble free, but in addition, is relatively inexpensive to manufacture.

The valve includes a tubular body having an inlet port, an outlet port and a valve chamber disposed between said ports and housing a rotatable valve member which includes a passage selectively communicating with the inlet and outlet ports. A cylinder is attached to and disposed about said valve body. A sleeve is likewise disposed about the valve body and is received by the cylinder in the manner of a piston. Fluid supplied to the cylinder reciprocates the sleeve and interconnecting means between the sleeve and the valve member oscillate the valve member as the sleeve is reciprocated.

The body includes a longitudinal opening which communicates with the valve chamber and the interconnecting means includes a transverse pin extending across the sleeve and through the tubular body.

The rotatable valve member is substantially a ball having a surface groove disposed transversely of the passage and engageable by the pin to induce oscillatory movement into the ball.

The sleeve includes first and second transverse pressure faces and the cylinder includes associated first and second transverse pressure faces. Associated pressure faces of the sleeve and cylinder partially define first and second pressure chambers and the cylinder includes first and second inlet apertures communicating respectively with associated pressure chambers.

The cylinder includes an annular closure wall which extends between the cylinder and the tubular body and provides the first pressure face. A second annular closure wall between the cylinder and the sleeve provides the second pressure face. The sleeve includes a collar providing the first and second pressure faces, the collar being operatively disposed between the cylinder annular closure walls.

The longitudinal opening in the tubular body includes opposed abutment portions disposed in spaced longitudinal relation and engageable by the transverse pin whereby to provide a stop means defining longitudinal travel of the sleeve and rotational travel of the ball. The opening also includes opposed margin portions engageable by the pin to preclude rotation of the sleeve relative to the body.

A fluid source selectively supplies fluid to the cylinder apertures so that the sleeve performs as a double-acting piston.

DESCRIPTION OF THE PREFERRED EMBODIMENT

Figure 1:
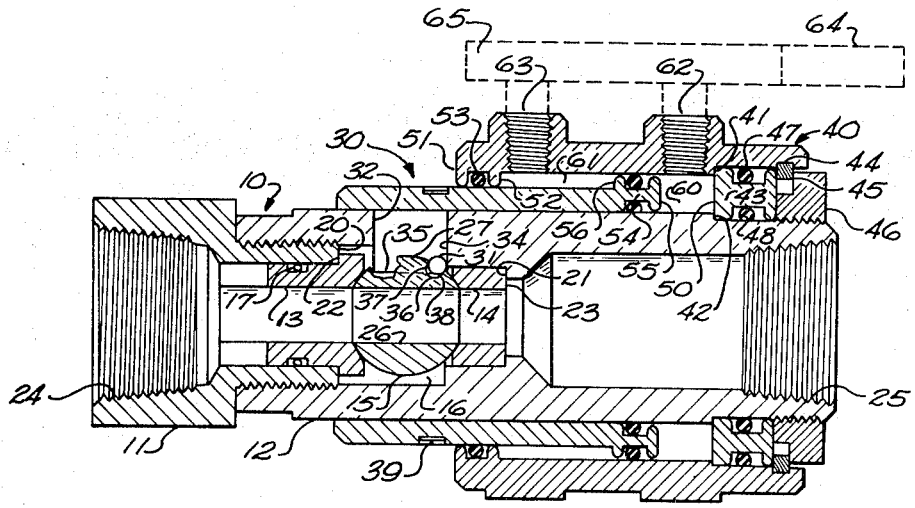
FIG. 1 is an elevational view in cross section illustrating the valve in the open position.

Referring now by characters of reference to the drawing, and first to FIG. 1, it will be understood that the valve includes a tubular body, generally indicated by numeral 10, and provided by threadedly interconnected body portions 11 and 12. The two threadedly connected body portions 11 and 12 provide adjustment for a pair of sealing rings 13 and 14 which seat a rotatable ball member 15 housed within a valve chamber 16. Each of the seals 13 and 14 includes a curved sealing face receiving the ball member 15 and facilitating rotation of said ball member 15 about its own axis. The upstream sealing ring 13 is recessed to accommodate a conventional O-ring 17. Each of the body portions 11 and 12 includes an annular abutment, 20 and 21 respectively, seating compatible shoulders 22 and 23 on associated sealing rings 13 and 14 respectively.

As indicated in FIG. 1, the body portion 11 includes an inlet port 24 and the body portion 12 includes an outlet port 25. Further, the rotatable ball member 15 includes a central aperture providing a passage 26 which, in the valve-open position, is in register with the sealing rings 13 and 14 and aligned with the inlet and outlet ports 24 and 25 respectively.

Figure 2:
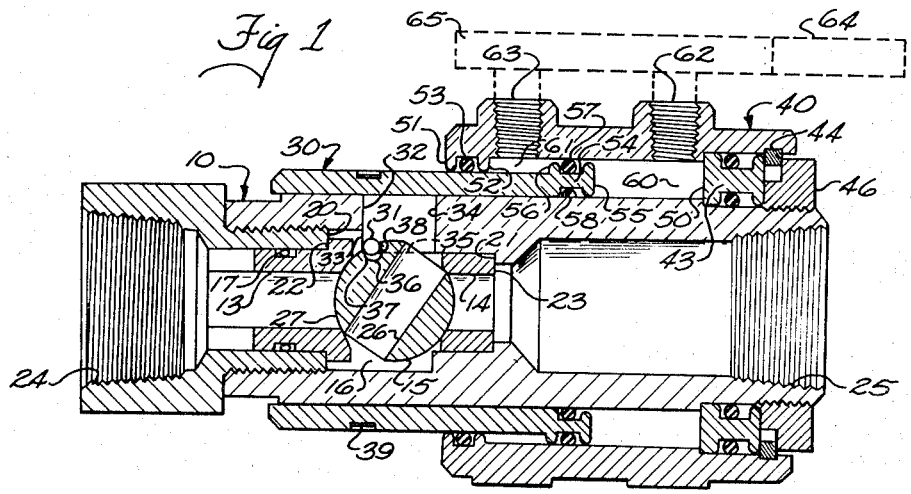
FIG. 2 is a similar view illustrating the valve in a closed position.

As shown in FIG. 2, the ball member 15 is rotatable to a valve-closed position in which the surface 27 of the ball 15 effectively closed the inlet port 24 and cuts off flow through the valve.

The ball member 15 is rotated or oscillated by means of a sleeve 30 coaxially mounted in reciprocating relation to the body 10.

Figure 3:
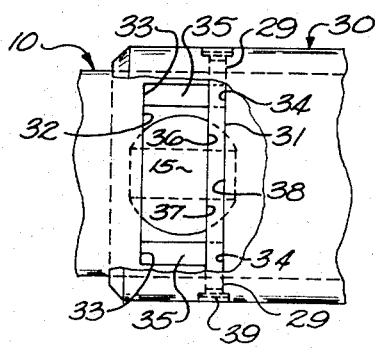
FIG. 3 is a fragmentary plan view illustrating the relationship of the sleeve and the valve body when the valve is in the open position.

The sleeve 30 and the ball member 15 are interconnected by means of a transverse pin 31 which extends between opposing side walls of the sleeve 30 and is connected to said sleeve by means of opposing apertures 29 into which the pin is fitted. The body 10 includes an opening, generally indicated by numeral 32, which is provided by cutting away part of the cylindrical side wall of the body portion 12 in the vicinity of the valve chamber 16. This opening 32 is clearly shown in FIG. 3 and includes abutment portions 33 and 34 which provide stop means defining longitudinal movement of the pin 31 relative to the body 10. The opening 32 is defined longitudinally by a pair of flat margins or ledges 35, which are disposed adjacent to the pin 31 and which, because the pin 31 is effectively connected to the sleeve 30, preclude rotation of the sleeve 30 relative to the body 10. Thus, the opening 32 defines longitudinal and rotational movement of the sleeve 30 relative to the body 10.

The ball member 15 includes a transverse groove 36 in its surface 27, said groove 36 including opposed shoulders 37 and 38, which project a sufficient distance up above the ledges 35 to assure engagement of the pin 31 in the groove 36, as the sleeve 30 is reciprocated between the abutments 33 and 34 of the opening 32.

The reciprocating motion of the sleeve 30, relative to the body 10, is induced by applying fluid pressure to said sleeve 30. To this end, the sleeve 30 is coaxially received within a cylinder, generally indicated by numeral 40. The cylinder 40 is attached to the body 10 and, in the assembled position, is effectively integral with said body 10. As shown clearly in FIGS. 1 and 2, the cylinder 40 and the body 10 are configurated to provide annular abutments 41 and 42, so spaced as to provide a seat for an I-shaped connector ring 43. The cylinder 40 includes a groove 44 receiving a split ring 45, adjacently disposed of the connector ring 43. A lock nut 46 is threadedly connected to the end of the body 10 to engage the connector ring 43 against the abutment 42 and secure the cylinder 40 to the body 10. The connector ring 43 includes inner and outer O-rings 47 and 48 respectively, providing an effective seal between the cylinder 40 and the body 10.

The connector ring 43 effectively provides a transverse annular closure wall between the cylinder 40 and the body 10 which in turn provides a transverse pressure face 50. At its remote end, the cylinder 40 includes a second annular closure wall 51 between the cylinder 40 and the sleeve 30, which provides a second transverse pressure face 52. The closure wall 51 is recessed to accommodate an O-ring 53 providing a seal between the cylinder 40 and the sleeve 30.

The sleeve 30, which is reciprocatively received within the annular space between the coaxially related cylinder 40 and tubular body 10, has an increased diameter at its received end to provide an enlarged annular rim 54 constituting a collar means and providing first and second transverse pressure faces 55 and 56. The enlarged rim 54 is recessed to accommodate inner and outer O-rings 57 and 58 providing seals between the sleeve 30 and the cylinder 40 and body 10 respectively.

The pressure faces 50 and 55 of the connector ring 43 and the enlarged rim 54 respectively, partially define a first pressure chamber 60. The pressure faces 52 and 56 of the closure wall 51 and the enlarged rim 54 respectively partially define a second pressure chamber 61. The cylinder 40 includes a pair of apertures 62 and 63, constituting first and second apertures, and communicating respectively with associated first and second pressure chambers 60 and 61. Fluid supplied to the first pressure chamber 60 expands said pressure chamber and urges the pressure faces 50 and 55 away from each other, thereby inducing longitudinal motion into the sleeve 30. Conversely, fluid supplied to aperture 63 expands the second pressure chamber 61 and urges the pressure faces 52 and 56 away from each other, thereby inducing longitudinal movement into the sleeve 30 in the opposite direction. Thus, the sleeve 30 effectively operates as a double-acting piston and, by supplying fluid pressure from a conventional source such as a compressed air cylinder, indicated schematically by numeral 64, and including a four-way valve 65, fluid pressure may be supplied to the pressure chamber 60 to rotate the ball member 15 into a closed position. The use of the four-way valve 65 permits pressure to be supplied or evacuated from either of the pressure chambers 60 and 61 and further, permits pressure to be maintained in either of said chambers 60 and 61, thereby holding the rotatable ball 15 in either the open or closed position as desired.

It is thought that the functional advantages of this automatic cut-off valve have become fully apparent from the foregoing description of parts, but for completeness of disclosure, the installation and operation of the device will be briefly summarized.

When the seals 13 and 14 are positioned with the body portions 11 and 12 respectively, the ball member 15 may be seated on one of said seals and the body portions 11 and 12 threadedly interconnected to house the ball member 15 within the body 10. The sleeve 30 is then slipped over the body 10 from the downstream end and the opposed pin apertures 29 aligned with each other, and with the ledges 35 and the ball member groove 36, to permit insertion of the pin 31 across the sleeve 30. When this is accomplished, a pin retaining spring 39 may be placed within the groove provided for it on the surface of the sleeve 30 to hold the pin 31 in place.

The combined sleeve 30 and the body 10 are inserted within the cylinder 40 and the connector ring 43, the retaining ring 45 and the lock nut 46 sequentially positioned to provide the completed valve assembly indicated clearly in FIGS. 1 and 2. The valve is coupled to an air supply, diagrammatically indicated by numeral 64 and including a four-way valve 65. The valve 65 is connected to the first and second pressure chambers 60 and 61 by virtue of apertures 62 and 63 respectively.

When fluid pressure is supplied to the pressure chamber 61, the sleeve is urged in a downstream direction until the pin 31 engages opposed abutment 34 as shown is FIG. 1. In this position, the passage 26 of the rotatable ball 15 is aligned with the inlet and outlet ports 24 and 25. When it is desired to close the valve, fluid pressure is introduced into pressure chamber 60, to urge the sleeve 30 in an upstream direction and oscillate the ball 15 in a counterclockwise direction to a closed position as shown in FIG. 2. Upstream movement of the sleeve 30 is limited by the engagement of the pin 31 with the upstream abutment 33 of the opening 32 and, in this position, the spherical surface of the ball 15 cuts off flow through the valve. The use of a four-way valve 65 provides that the automatic valve may be held in an open or closed position as desired.

It will be understood that the preferred embodiment as described above provides a means of operating the valve between open and closed positions by utilizing the sleeve 30 as a double-acting piston. If it should prove desireable, resilient means, such as a coiled spring, could be provided in either one of the pressure chambers and the valve operated automatically by applying fluid pressure sufficiently great to overcome the bias of the spring and induce longitudinal movement into the sleeve 30 thereby oscillating the rotatable ball valve 15. The release of pressure in the pressurized cylinder would result in the spring moving said sleeve 30 in the opposite direction.

I claim as my invention:

1. An automatic valve comprising:
    a. a valve body including an inlet port, an outlet port and a valve chamber disposed between said ports,
    b. a rotatable valve member mounted in the valve chamber and including a passage selectively communicating with the inlet and outlet ports,
    c. cylinder means disposed about the valve body and, a first pressure face between the cylinder means and valve body, the cylinder means having one end transversely spaced from the body,
    d. sleeve means slidably disposed about the valve body and movingly received in the space between the said one end of the cylinder means and the valve body, the sleeve means having a pressure face that cooperates with the said first pressure face to provide a pressure chamber,
    e. means selectively supplying fluid pressure to the pressure chamber incident to reciprocating of said sleeve means, and
    f. interconnecting means between the sleeve means and the rotatable valve member oscillating said valve member as the sleeve means is reciprocated.

2. An automatic valve comprising:
    a. a valve body including an inlet port, an outlet port and a valve chamber disposed between said ports,
    b. a rotatable valve member mounted in the valve chamber and including a passage selectively communicating with the inlet and outlet ports,
    c. cylinder means disposed about the valve body and, a first pressure face between the cylinder means and valve body, the cylinder means having one end transversely spaced from the body,
    d. sleeve means slidably disposed about the valve body and movingly received in the space between the said one end of the cylinder means and the valve body, the sleeve means having a pressure face that cooperates with the said first pressure face to provide a pressure chamber,
    e. means selectively supplying fluid pressure to the pressure chamber incident to reciprocating of said sleeve means, and
    f. interconnecting means between the sleeve means and the rotatable valve member oscillating said valve member as the sleeve means is reciprocated,
    g. the sleeve means including a portion extending longitudinally outwardly of the spaced end, and
    h. the interconnecting means including a transverse element projecting from said extending portion and through the body to engage the valve member.

3. An automatic valve as defined in claim 1, in which:
    g. the sleeve means includes a portion extending longitudinally outwardly from said spaced end of the cylinder means and having opposed side wall portions,
    h. the interconnecting means includes an elongate transverse pin extending between said side wall portions, and
    i. the rotatable valve member includes a surface groove disposed transversely of the passage and engageable by the transverse pin.

4. An automatic valve comprising:
    a. a tubular valve body including an inlet port, and outlet port, a valve chamber disposed between said ports, and a longitudinal opening,
    b. a rotatable valve member mounted in the valve chamber and including a passage selectively communicating with the inlet and outlet ports,
    c. a cylinder disposed in coaxial relation about the valve body and including inwardly extending closure means providing a pressure face,
    d. a sleeve disposed in coaxial relation about the valve body and including a pressure face disposed in selectively spaced relation from the pressure face of the closure means and cooperating with said pressure face to partially define a pressure chamber said sleeve including a portion extending selectively longitudinally outwardly from the pressure face of the closure means,
    e. the cylinder including an aperture communicating with the pressure chamber and adapted to selectively supply fluid under pressure to the pressure chamber incident to reciprocation of the sleeve, and
    f. interconnecting means between the longitudinally extending portion of the sleeve and the rotatable valve member extending through the longitudinal opening and oscillating the valve member when the sleeve is reciprocated.

5. An automatic valve comprising:
    a. a tubular valve body including an inlet port, an outlet port, a valve chamber disposed between said ports, and a longitudinal opening,
    b. a rotatable valve member mounted in the valve chamber and including a passage selectively communicating with the inlet and outlet ports,
    c. a cylinder disposed in coaxial relation about the valve body and including inwardly extending closure means providing a pressure face,
    d. a sleeve disposed in coaxial relation about the valve body and including a pressure face disposed in selectively spaced relation from the pressure face of the closure means and cooperating with said pressure face to partially define a pressure chamber,
    e. the cylinder including an aperture communicating with the pressure chamber and adapted to selectively supply fluid under pressure to the pressure chamber incident to reciprocation of the sleeve,
    f. interconnecting means between the sleeve and the rotatable valve member extending through the longitudinal opening and oscillating the valve member when the sleeve is reciprocated, g. the rotatable valve member including opposed abutment portions, h. the interconnecting means between the sleeve and the rotatable valve member including a transverse pin extending across the sleeve and through the body opening to selectively engage said abutment portions, and i. the longitudinal opening including opposed abutment portions disposed in spaced longitudinal relation and engageable by the pin to provide stop means defining the longitudinal travel of the sleeve.

6. An automatic valve as defined in claim 4, in which:

g. the cylinder closure means includes an annular wall extending transversely between the cylinder and the sleeve providing the cylinder pressure face, and h. the sleeve includes collar means providing the sleeve pressure face.

7. An automatic valve as defined in claim 4, in which:

g. the cylinder closure means includes an annular wall between the cylinder and the tubular body providing a first pressure face, h. the cylinder closure means includes a second annular wall extending transversely between the cylinder and the sleeve, and providing a secondary pressure face, i. the sleeve is slidably received within the second annular wall and includes collar means providing first and second pressure faces operatively disposed between the cylinder annular walls, j. associated cylinder and sleeve pressure faces define first and second pressure chambers, k. the cylinder includes a second aperture communicating with the second pressure chamber and adapted to selectively supply fluid under pressure to the second pressure chamber incident to reciprocation of the sleeve.

8. An automatic valve comprising:

a. a tubular valve body including an inlet port, an outlet port, a valve chamber disposed between said ports, and a longitudinal opening, b. a rotatable valve member mounted in the valve chamber and including a passage selectively communicating with the inlet and outlet ports, c. a cylinder disposed in coaxial relation about the valve body and including inwardly extending closure means providing a pressure face, d. a sleeve disposed in coaxial relation about the valve body and including a pressure face disposed in selectively spaced relation from the pressure face of the closure means and cooperating with said pressure face to partially define a pressure chamber, e. the cylinder including an aperture communicating with the pressure chamber and adapted to selectively supply fluid under pressure to the pressure chamber incident to reciprocation of the sleeve, f. interconnecting means between the sleeve and the rotatable valve member extending through the longitudinal opening and oscillating the valve member when the sleeve is reciprocated, g. the interconnecting means between the sleeve and the rotatable valve member including a transverse pin extending across the sleeve and through the body opening, and h. the body opening including opposed margins disposed in side-by-side relation and engageable with the pin to preclude relative coaxial rotation between the sleeve and the body.

* * * * *